Oct. 29, 1963 N. B. KELL 3,108,494
ACCESSORY DRIVE MECHANISM
Filed Oct. 6, 1960 2 Sheets-Sheet 1

INVENTOR.
Nathaniel B. Kell
BY
R. L. Spencer
ATTORNEY

Oct. 29, 1963    N. B. KELL    3,108,494
ACCESSORY DRIVE MECHANISM
Filed Oct. 6, 1960    2 Sheets-Sheet 2
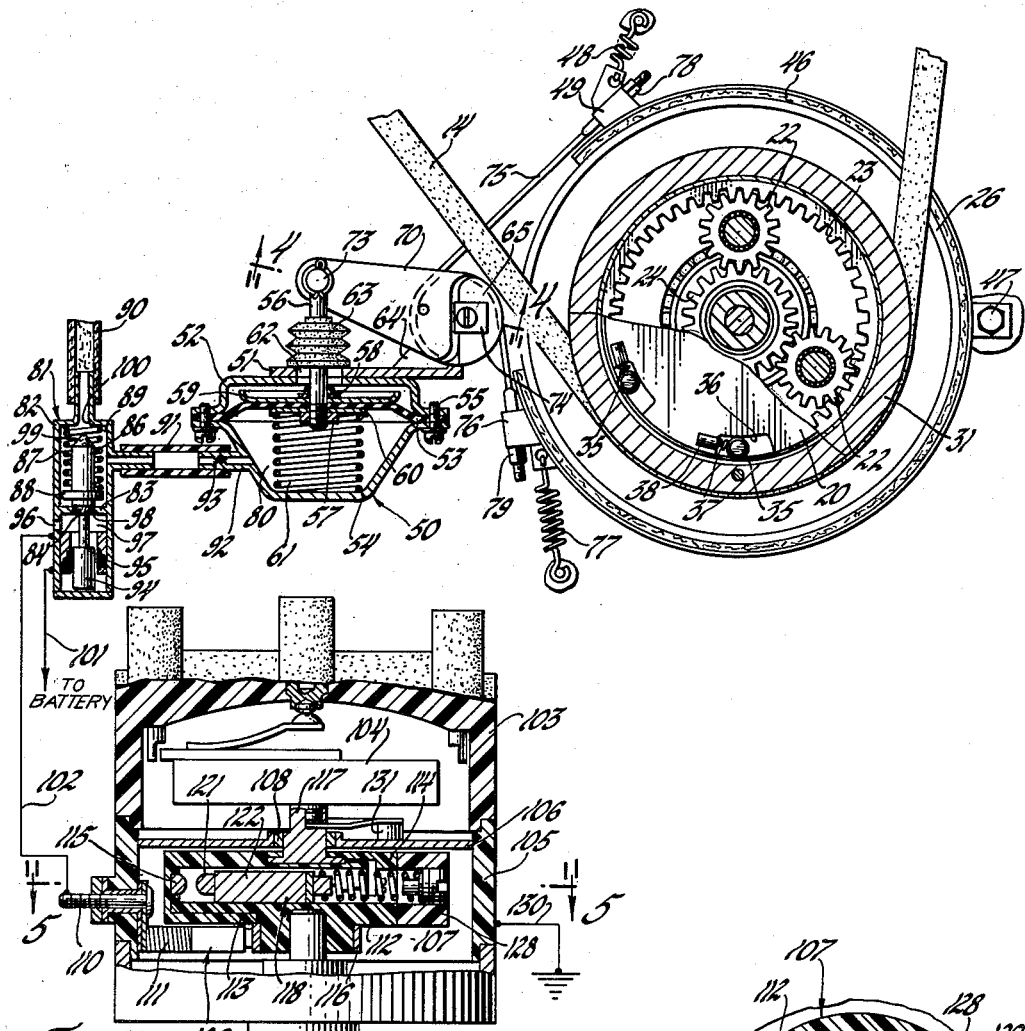
INVENTOR.
Nathaniel B. Kell
BY
R. L. Spencer
ATTORNEY United States Patent Office
3,108,494
Patented Oct. 29, 1963

3,108,494
ACCESSORY DRIVE MECHANISM
Nathaniel B. Kell, Indianapolis, Ind., assignor to General Motors Corporation, Detroit, Mich., a corporation of Delaware
Filed Oct. 6, 1960, Ser. No. 61,003
4 Claims. (Cl. 74—752)

This invention relates to accessory drive mechanisms and more particularly to a multiple ratio accessory drive wherein the speed of rotation of engine accessories may be changed with respect to the speed of rotation of the power input or drive shaft used to drive the accessories.

In accessory drives for use in automotive vehicles it is desirable to be able to vary the speed of rotation of the engine accessories with respect to engine speed in order to assure proper functioning of the accessories throughout a wide range of engine speed. At low engine speeds it is desirable, for example, to drive the accessories at a faster speed of rotation than that of the engine, while at high engine speeds it is desirable to drive the accessories at engine speed to prevent undesirable overspeeding of the accessories. Engine accessories such as the cooling fan, water pump, generator, air brake compressor, power steering pump and air conditioner compressor must be driven at adequate speed to properly perform their function and at the same time must not be driven at unduly high speed during higher vehicle speeds. This invention prevents needless waste of engine horsepower, reduces noise level, prevents undue wear of the accessories and saves fuel.

An object of this invention is to provide a two-speed step ratio transmission for driving engine accessories of an engine driven vehicle.

Another object of this invention is to provide two-speed accessory drive providing automatic shifts of drive ratio.

A further object of this invention is to provide an accessory drive pulley assembly of compact structure and containing a plural ratio transmission therein.

A more particular object of this invention is to provide a plural step ratio transmission for driving engine accessories, and control means for automatically controlling the transmission drive ratio incorporating a vacuum actuator, a solenoid valve and a speed responsive switch.

Another object of this invention is to provide an automatic control responsive to speed for controlling the drive ratio of an accessory drive transmission and arranged to prevent hunting or cycling between drive ratios.

An additional object of this invention is to provide an accessory drive step ratio transmission incorporating a speed responsive switch and a solenoid valve for controlling the admission of vacuum to a power unit to control the transmission drive ratio.

A particular object of this invention is to provide a control for an accessory drive step ratio transmission including a vacuum power actuator, a solenoid valve for controlling the admission of vacuum to the actuator and a centrifugally responsive switch positioned in and driven by an ignition distributor for controlling the transmission drive ratio.

These and other objects and advantages of this invention will be apparent from the following description and claims, taken in conjunction with the accompanying drawings, in which:

FIGURE 3 is a sectional view taken along the line 3—3 of FIGURE 2.

FIGURE 4 is a sectional view taken along the line 4—4 of FIGURE 3.

FIGURE 5 is a sectional view taken along the line 5—5 of FIGURE 3.

Figure 1:
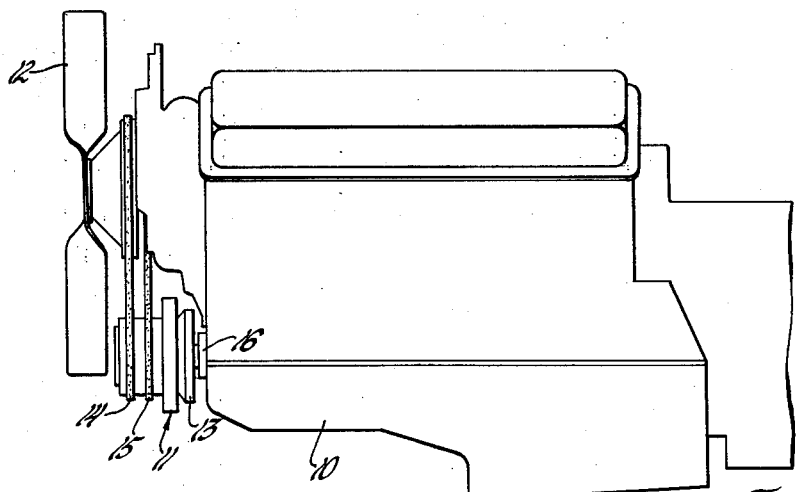
FIGURE 1 is a side elevation of a vehicle engine showing an accessory drive transmission constructed in accordance with the principles of this invention mounted on the engine and driven thereby.

Referring to FIGURE 1, there is shown an engine 10, a multiple speed accessory drive unit 11 constructed in accordance with the principles of this invention for driving a fan 12. Drive unit 11 is mounted on a harmonic balancer 13 used to dampen engine vibrations and drives fan 12 and other engine accessories through belts 14 and 15. For example, belt 14 may drive fan 12, an engine driven generator and a power steering pump, not shown. Belt 15 may drive an air compressor and refrigerant compressor of an air conditioning unit, not shown.

Figure 2:
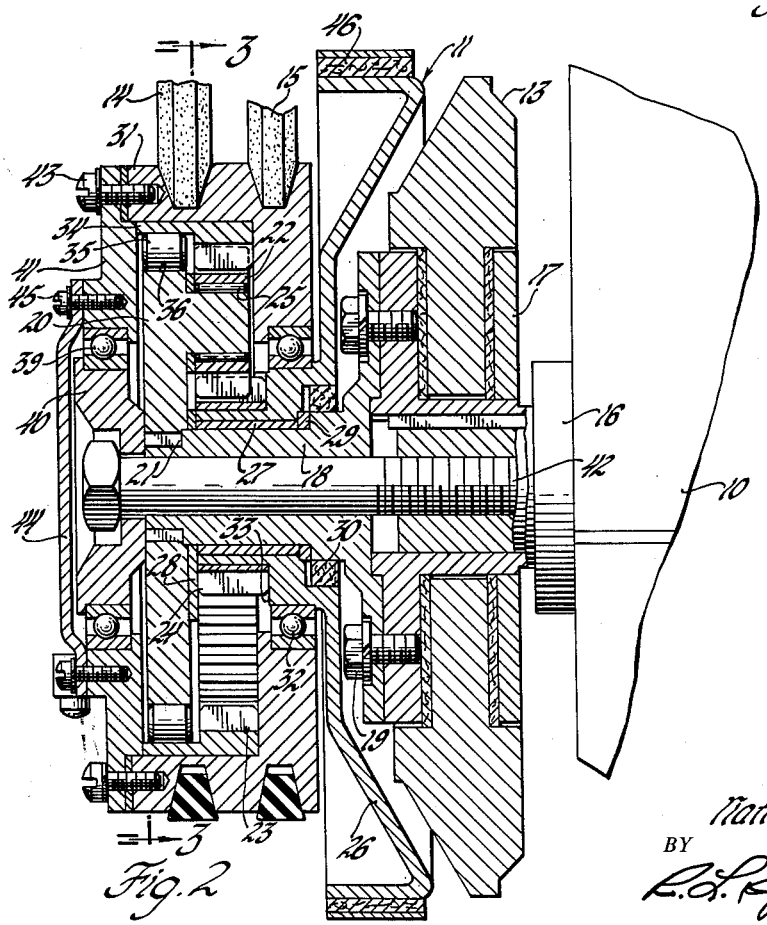
FIGURE 2 is a sectional view through the transmission of FIGURE 1.

In FIGURE 2 details of the multiple speed drive unit are illustrated. An engine driven shaft such as a crankshaft 16 drives a hub 17 of a harmonic balancer 13, the hub 17 and shaft 16 rotating at engine speed. A stub shaft 18 bolted to hub 17 by a series of bolts 19 is driven at engine speed and functions both as a drive shaft and a support member for the two-speed drive unit. A planet carrier 20 is keyed to stub shaft 18 by keys 21 so as to be driven by the shaft. Planet carrier 20 supports three planet pinion gears, one being shown at 22 in mesh with a ring gear 23 and a sun gear 24, the planet pinion gears 22 being rotatably supported in carrier 20 by means of needle bearings 25. Sun gear 24 is fixed to a brake drum 26, the sun gear and brake drum being rotatable as a unit and rotatably supported upon stub shaft 18 by means of a bushing 27. A pair of thrust washers 28 and 29 position brake drum 26 in its proper assembled relationship on stub shaft 18, and a seal 30 prevents loss of lubricant from the unit.

Ring gear 23 is press fitted to a pulley 31 so as to be rotatable with the pulley, there being a roller bearing 32 supporting the pulley and ring gear for rotation upon an axially extending support boss 33 on brake drum 26. An axial extension 34 of ring gear 23 forms an internal race for one-way clutch rollers 35. Inner cams 36 of the one-way clutch are formed on the outer periphery of planet carrier 20. As best shown in FIGURE 3, a series of small coil springs 37 and tubular plungers 38 hold rollers 35 in their proper position. Pulley 31 is rotatably supported at the front end of the unit by a ball bearing 39 disposed between a support 40 and a cover 41. Support 40 is fixed to crankshaft 16 by means of a bolt 42 extending through stub shaft 18 and serving as a base support for stub shaft 18. Cover 41 is fastened to pulley 31 by screws 43. A cover plate 44 fastened to cover 41 by screws 45 overlies the bearing 39 and the end of bolt 42 and cooperates with cover 41 to completely enclose the end of the unit.

Brake drum 26, which rotates as a unit with sun gear 24 and which may be made integral with the sun gear may be prevented from rotating by a brake band 46. As best shown in FIGURE 3, band 46 may be anchored by a bolt 47 to some stationary part of the engine. A retracting spring 48 fastened at one end to a stationary part of the engine and at the opposite end to a retainer 49 on band 46 assures complete release of the band from drum 26 when the band is released.

Brake actuating mechanism is provided by a diaphragm type power unit indicated generally at 50, through a lever, sheave, and cable arrangement. A fixed mounting or support plate 51 supports a base 52 of power unit 50, the base 52 being welded to plate 51. A diaphragm 53 is retained at its outer periphery between base 52 and a cover 54 by means of a series of screws 55. A stem 56 is mounted on diaphragm 53 by means of a nut 57 and a boss 58, the boss 58 being fixed to stem 56. A pair of diaphragm protectors 59 and 60 protect the diaphragm against damage. A spring 61 seated upon cover 54 and protector 60 yieldably biases the diaphragm and stem 56 to its upward or band release position illustrated in FIGURE 3. A flexible dirt protector 63 fastened to plate 51 and to stem 56 prevents dirt from entering the unit through opening 62 in plate 51 through which stem 56 extends. An upstanding support 64 on member 51 supports a pulley 65 for rotation therein. As best shown in FIGURE 4, pulley 65 is rotatably supported in support 64 by means of a bushing 66 cooperating with a stem 67 formed integrally with pulley 65 and a bushing 68. A pin 69 retains the stem 67 in the assembly. An actuating arm 70 is secured to pulley 65 by screw 71. The opposite end of arm 70 is secured to stem 56 by means of a clevis 72 on the end of stem 56 and a pin 73 which extends through clevis 72 and arm 70. A clamp 74 serves to prevent a cable 75 from slipping on pulley sheave 65.

As best shown in FIGURE 3, a cable 75 having one end anchored in retainer 49 passes through pulley sheave 65 and has its opposite end anchored in a retainer 76 on brake band 46. A second band release spring 77 cooperates with retainer 76 to release the band from brake drum 26. Adjusting nuts 78 and 79 are provided for adjusting the brake.

Power unit 50 is provided with a chamber 80 adapted to receive vacuum from the engine to apply brake band 46 to brake drum 26. When chamber 80 is evacuated, diaphragm 53 will move downwardly against the action of spring 61, thereby drawing stem 56 inwardly and causing counterclockwise rotation of arm 70 and sheave 65 to tighten flexible cable 75 and apply the brake.

A solenoid valve 81 comprises a casing 82 having a web 83 therein and forming a valve seat 84 for a valve member 86. A spring 87 seated on housing 82 and upon an annular flange 88 on valve 86 yieldably biases valve 86 into contact with seat 84. Valve chamber 89 is connected to a source of vacuum such as the intake manifold of the engine 10 by means of a vacuum tube 90 and to chamber 80 of power unit 50 by a hose 91. A restriction 93 is provided in nipple 92 to which hose 91 is attached. Beneath valve seat 84 there is provided a stem extension 94 fixed to valve 86 and cooperating with a solenoid coil 95. An opening 96 is provided through casing 82 such that solenoid chamber 97 is in continuous communication with the atmosphere. Valve 86 is provided with conical ends 98 and 99 and housing 82 is shaped to provide a second valve seat 100 adapted to receive conical end 99 of valve 86 when solenoid coil 95 is energized.

In the position shown, solenoid coil 95 is deenergized so that spring 87 positions valve 86 with conical end 98 on valve seat 84 and with conical end 99 removed from valve seat 100. In this position the valve 86 connects chamber 80 to engine vacuum and at the same time blocks off opening 96 from chamber 80. The vacuum in chamber 80 will be effective to move diaphragm 53 against spring 61 to thereby cause rotation of pulley 65 counterclockwise to engage brake band 46 to drum 26. When solenoid 95 is energized, valve 86 rises against the action of spring 87 to remove conical end 98 from valve seat 84 and place conical end 99 into contact with valve seat 100. This cuts off engine vacuum and allows air to enter vent 96 and flow to chamber 80. Release springs 48 and 77 will be effective to release the brake. Restriction 93 serves to delay the rate of engagement of band 46 to drum 26 to provide smooth engagement of the band to the drum without grabbing. Restriction 93 further serves to prevent undesirable cycling of the shift of drive ratio.

Further referring to FIGURE 3, there is shown a governor for controlling solenoid valve 86 to cause a shift of drive ratio when a predetermined vehicle speed is obtained. A wire 101 connects to the vehicle battery and a wire 102 connects to a governor switch. The governor switch is an assembly inserted in the ignition distributor after removing the distributor cap 103 and rotor 104. The cap and rotor are then reinstalled. A governor housing 105 includes a plate 106 which enters the rotor assembly 107 radially in a bushing 108. Also attached to the housing is a brush assembly 109, the brush assembly being electrically insulated from the housing. A screw 110 secures the brush assembly to the housing and makes electrical contact with the brush holder 111 and wire 102. The main body 112 of rotor assembly 107 is made of insulating material such as, for example, Bakelite. Electrical connections 113, 114, contact 115, collector ring 116 and shaft 117 are molded into the rotor assembly 107. A movable contact assembly 118 is installed in a recess 119 of the rotor body 112, the contact assembly including a plate 120 electrically connected to a contact 121 by body 122 and electrically connected to connection 114 by a wire 123. A pair of springs 124 and 125 carried by body 112 yieldably bias contact 121 to a remote position with respect to contact 115. A spring 126 seated upon plate 120 and a movable plug 127 carried by a rotor segment 128 secured to body 112 by screws 129 opposes the action of springs 124 and 125. Electrical connection between contact assembly 118 and a ground connection 130 is made through wire 123, connection 114, shaft 117 and a brush arm 131 which rotates on plate 106.

In operation, when the engine is not running, no vacuum exists in vacuum chamber 80. As a result, spring 61 pushes the diaphragm assembly upward causing the brake 46 to be released from brake drum 26. In this position, the sun gear 24 and brake drum 26 are free to rotate. When the engine is first started, stub shaft 18 rotates at engine speed and drives planet carrier 20 fixed to shaft 18 in a clockwise direction. The planet pinions 22, being rotated with the planet carrier and meshed with sun gear 24 and ring gear 23 tend to rotate both gears. Sun gear 24, being free to rotate, tends to rotate faster than ring gear 23 which is restrained by the accessory load which pulley 31 must drive. Thus, pulley 31 and ring gear 23 fastened thereto tend to remain stationary. This causes rollers 35 to wedge between planet carrier cam surface 36 and the internal surface of extension 34 on ring gear 23. This action locks the carrier 20 to ring gear 23 so that pulley 31 is driven at crankshaft speed or direct drive. However, this direct drive ratio is only momentarily maintained until such time that engine vacuum can exhaust the air from vacuum chamber 80. This requires a few seconds time because the air in chamber 80 must be exhausted through restriction 93.

When the air is exhausted from chamber 80, brake 46 is applied to drum 26 to prevent rotation of drum 26 and sun gear 24. Pinions 22 must therefore walk around sun gear 24 which serves as a fixed reaction member and drive ring gear 23 and pulley 31 in overdrive with respect to crankshaft speed. Rollers 35 automatically disengage when ring gear 23 tends to overspeed planet carrier 20.

Overdrive ratio is maintained until the engine reaches a predetermined speed of rotation. When such a speed is reached and maintained for a limited time, the governor switch acts to reduce the speed of pulley 31 from overdrive to direct drive. Rotor assembly 107 is driven by the distributor at one-half the engine speed. Rotation of rotor assembly 107 causes contact assembly 118 to move toward contact 115 and compress springs 124 and 125 because of centrifugal force applied to contact assembly 118. Springs 124 and 125 oppose this outward movement while spring 126 assists it. Springs 124 and 125 are so calibrated that without the assistance of spring 126, a vehicle speed of 45 miles per hour in direct drive is required to bring the contacts 115 and 121 together. Spring 126 is calibrated to decrease the speed at which contacts 115 and 121 come together to within a 30 to 40 miles per hour range. The speed within this range at which the contacts meet is adjusted by setting the adjusting screw 127. Once the adjustment is made the governor switch will close at the engine speed which is equivalent to the vehicle speed for which the adjustment was set. Closing of the contacts 115—121 completes the circuit from solenoid 95 to ground 130.

When the circuit is completed, solenoid valve 86 moves upward against spring 87 and blocks off vacuum passage 90. At the same time, chamber 80 is connected to atmosphere through opening 96. Atmospheric pressure flows to chamber 80 through restriction 93. Restriction 93 serves an important function in that it presents a time delay in the operation of power unit 50 and thereby prevents "hunting" or cycling between shifts at intervals wherein the vehicle speed may be alternating between a speed just above and just below the speed at which a shift of ratio is called for. A few seconds time is required to admit enough air to replace the vacuum in chamber 80. Thus if the vehicle speed should only momentarily exceed the shift speed and then drop below the shift speed no shift of ratio will occur even though the solenoid was momentarily energized.

When sufficient air enters chamber 80, spring 61 will push the diaphragm upward to permit release of the brake. Upon release of brake 46, carrier 20 will drive ring gear 23 and pulley 31 at crankshaft speed due to the wedging action of rollers 35. In the present embodiment the diameter of pulley 31 is such that at overdrive ratio, the accessories will be driven at a speed that approximates that of the accessories on a vehicle not equipped with this device and being driven at the same road speed. In direct drive the speed of the pulley is approximately .7 of what it is in overdrive.

The switch unit driven by the distributor provides a compact, simple and economical structure utilizing existing drive facilities and is readily adaptable to be installed in existing distributors. The adjustment screw 127 and spring 126 provide a simple means for varying the predetermined speed of rotation at which the switch will close to change the transmission drive ratio. This adjustment may be easily and simply made by a vehicle operator to provide the most satisfactory operation range for the particular type of service encountered.

I claim:

1. An accessory drive for driving the accessories of an engine comprising a hollow sleeve shaft supported upon said engine and continuously driven by said engine, a rotatable power delivery housing forming a chamber therein, a planet carrier disposed in said chamber and continuously driven by said hollow sleeve shaft, a power delivery ring gear in said chamber and fixed to said housing for rotation therewith, an engageable and releasable one-way clutch disposed in said chamber between said planet carrier and said housing effective when engaged to connect said carrier to said housing for rotation therewith at unitary speed, a rotatable brake drum at one side of said housing rotatably supported upon said hollow sleeve shaft and having an extension disposed in said chamber, a reaction sun gear in said chamber fixed to said brake drum extension for rotation therewith, planet pinion gears disposed in said chamber rotatably supported on said planet carrier and in mesh with said reaction sun gear and said ring gear respectively, a support member adjacent one end of said hollow sleeve shaft at the side opposite said housing from said brake drum, a bolt extending through said hollow sleeve shaft and said support member for retaining said support member in abutting relationship with said one end of said hollow sleeve shaft, a first bearing disposed between said brake drum and said housing at one side of said housing, a second bearing disposed between said support member and said housing, belt means connecting said housing to said accessories for driving the same, and an engageable and releasable brake band effective when engaged to said brake drum to prevent rotation of said reaction sun gear to establish overdrive of said housing with respect to speed of rotation of said engine.

2. A two speed accessory drive for driving the accessories of a vehicle engine comprising in combinaiton a hollow power input member directly connected to said engine and continuously driven by said engine at a constant fixed speed ratio with respect to engine speed, a power delivery member comprising a pulley adapted to be driven at variable speeds of rotation with respect to the speed of rotation of said engine including direct drive and overdrive, belt means connecting said pulley to said accessories for driving said accessories, spaced side walls on said pulley partially enclosing a chamber within said pulley, a planet carrier disposed in said chamber and continuously driven by said hollow power input member, a sun gear in said chamber, a brake drum external of said chamber at one side of said pulley having a cylindrical portion coaxial with said power input member extending into said chamber and fixed to said sun gear, said power input member extending through said cylindrical portion of said brake drum for supporting said drum, an annular shoulder on said brake drum, a bearing between said shoulder and one side wall of said pulley, said shoulder and bearing completing the closure of said chamber and providing a support rotatably supporting said one side wall of said pulley, an annular support at the other side of said pulley, a bolt extending through said power input member and said annular support for retaining said annular support in assembled relationship to said power input member, a bearing between said annular support and the other pulley side wall, said annular support and bearing cooperating with said other pulley side wall to close off said chamber and to rotatably support said other pulley side wall, a power delivery ring gear in said chamber and fixed to said pulley for rotation therewith as a unit, planet pinion gears supported on said carrier in mesh with said sun gear and ring gear, an engageable and releasable brake adapted to be applied to said drum to prevent rotation of said drum and to be released from said drum to permit free rotation of said drum, and a one-way clutch disposed between said planet carrier and said pulley effective to drive said pulley from said carrier at the speed of rotation of said carrier when said brake is released from said drum, and means directly responsive to engine speed for controlling engagement and release of said brake.

3. A two speed accessory drive for driving the accessories of a vehicle engine comprising in combination a hollow power input shaft directly connected to and continuously driven by said engine at a constant speed ratio with respect to engine speed, a power delivery pulley adapted to be driven at different speed ratios with respect to engine speed including direct drive and overdrive, belt means connecting said pulley to said accessories for driving said accessories, a pair of spaced side walls on said pulley partially enclosing a chamber within said pulley, a planet carrier disposed in said chamber and continuously driven by said hollow power input shaft, a reaction sun gear in said chamber, a brake drum external of said chamber and having a cylindrical portion coaxial with said power input shaft and fixed to said reaction sun gear, a shoulder on said brake drum, a bearing between said shoulder and one of said pulley side walls for rotatably supporting said side wall on said shoulder, said shoulder, bearing and side wall cooperating to enclose one side of said chamber, an annular support at the opposite side of said pulley from said brake drum, a bearing between said annular support and the other of said pulley side walls rotatably supporting said other pulley side wall on said annular support and cooperating with said annular support to enclose said chamber, bolt means extending through said power input member and said annular support for retaining said annular support in assembled relationship with said power input member, a power delivery ring gear disposed in said chamber and fixed to said pulley for driving said pulley, planet pinion gears supported on said planet carrier in mesh with said ring gear and sun gear, a one way clutch in said chamber disposed between said carrier and pulley effective when engaged to connect said carrier to said pulley for driving said pulley directly from said carrier, an engageable and releasable brake effective when engaged to said brake drum to prevent rotation of said sun gear to thereby establish overdrive of said pulley with respect to the speed of rotation of said power input shaft, spring means normally releasing said brake from said brake drum, a vacuum motor operatively connected to said brake, passage means connecting said vacuum motor to said engine as a source of vacuum, a solenoid valve in said passage means effective in a first position to connect said vacuum motor to vacuum through said passage means and effective in a second position to block off said vacuum motor from vacuum and to connect said vacuum motor to atmosphere, spring means positioning said solenoid valve in said first position when said solenoid valve is deenergized to establish overdrive of said pulley when said solenoid valve is deenergized, a centrifugal switch driven by said engine at a speed directly proportional to engine speed for controlling energization and deenergization of said solenoid valve, spring means yieldably positioning said centrifugal switch to deenergize said solenoid valve to establish overdrive through said planetary gearing at engine speeds below a predetermined engine speed, said centrifugal switch being movable to a closed position to energize said solenoid valve to establish direct drive through said one-way clutch at speeds above said predetermined engine speed.

4. An accessory drive for driving the accessories of a vehicle engine comprising a hollow input shaft driven by said engine at a speed directly proportional to engine speed, a rotatable power delivery pulley having spaced side walls at opposite sides of said pulley, said pulley forming a chamber therein, a planet carrier disposed in said chamber and driven by said input shaft, a reaction sun gear disposed in said chamber, a brake drum having a cylindrical portion coaxial with said power input shaft rotatably supporting said brake drum on said power input shaft and fixed to said reaction sun gear, an annular shoulder on said brake drum, a bearing between said shoulder and one of said side walls of said pulley, an annular support member at the opposite side of said chamber, means extending through said hollow power input shaft and said annular support member for retaining said annular support member in assembled relationship on said power input shaft, a bearing between said annular support member and the other of said pulley side walls, belt means connecting said pulley to said engine accessories for driving the same, ring gear disposed in said chamber and fixed to said pulley for rotation therewith, planet gears on said carrier in mesh with said sun gear and ring gear, a one-way clutch in said chamber effective when engaged to connect said carrier to said pulley, an engageable and releasable brake band for said brake drum effective when engaged to prevent rotation of said brake drum and said reaction sun gear, spring means normally effective to release said brake band from said drum, a vacuum motor operably connected to said brake band, passage means connecting said vacuum motor to said engine as a source of vacuum, a solenoid valve in said passage means effective in a first position to block off said motor from atmosphere and to connect said motor to said vacuum source, spring means yieldably biasing said solenoid valve to said first position when said solenoid valve is deenergized, a centrifugal switch driven directly by said engine at a speed directly proportional to engine speed for controlling energization and deenergization of said solenoid valve, spring means yieldably biasing said centrifugal switch to an open position in opposition to centrifugal force, additional spring means yieldably biasing said centrifugal switch toward a closed position and assisting centrifugal force, adjustable means associated with said last-mentioned spring means for adjusting the force effect of said last-mentioned spring means on said centrifugal switch, said switch being movable at a predetermined engine speed to a closed position to energize said solenoid valve, said solenoid valve being movable when energized to block off said vacuum motor from said vacuum source and to connect said vacuum motor to exhaust to release said brake band from said drum.

References Cited in the file of this patent
UNITED STATES PATENTS

| | | |
|---|---|---|
| 2,409,506 | McFarland | Oct. 15, 1946 |
| 2,901,924 | Banker | Sept. 1, 1959 |

FOREIGN PATENTS

| | | |
|---|---|---|
| 788,750 | Great Britain | Jan. 8, 1958 |